US005146676A

United States Patent [19]

Cuba

[11] Patent Number: 5,146,676

[45] Date of Patent: Sep. 15, 1992

[54] HAND-ACTUATED SPRING CLIP INSERTION TOOL

[75] Inventor: Gary W. Cuba, Hopkins, S.C.

[73] Assignee: Westinghouse Electric Corp., Pittsburgh, Pa.

[21] Appl. No.: 785,593

[22] Filed: Oct. 30, 1991

[51] Int. Cl.[5] .............................................. B23P 19/04

[52] U.S. Cl. .......................................... 29/229; 29/235; 29/243.56; 29/268

[58] Field of Search ................. 29/229, 235, 268, 267, 29/225, 243.56

[56] References Cited

U.S. PATENT DOCUMENTS

| | | | |
|---|---|---|---|
| 2,373,193 | 4/1945 | Lipp . | |
| 3,177,565 | 3/1965 | Martin et al. | 29/229 |
| 3,553,817 | 4/1968 | Lallak | 29/235 |
| 3,597,828 | 8/1971 | Clark . | |
| 4,216,585 | 8/1980 | Hatter . | |
| 4,454,642 | 6/1984 | Liechty | 29/235 |
| 4,501,054 | 2/1985 | Morgan . | |
| 4,514,889 | 5/1985 | Ferlan et al. . | |
| 4,765,049 | 8/1988 | Lundquist | 29/235 |
| 4,785,517 | 11/1988 | Takono | 29/235 |
| 4,807,343 | 2/1989 | Wadsworth | 29/235 |

*Primary Examiner*—Robert C. Watson
*Attorney, Agent, or Firm*—J. C. Spadacene

[57] ABSTRACT

A hand-actuated insertion tool includes a handle assembly, an elongated hollow tubular outer support tube, an elongated inner pull rod, and a coupling arrangement. The handle assembly has a first handle member and a second handle member pivotally mounted to the first handle member for movement between unactuated and actuated positions. The outer support tube is attached in a fixed relation to the first handle member. The inner pull rod is mounted within the outer support tube for sliding movement relative thereto between home and retracted positions. The coupling arrangement pivotally connects the inner pull rod to the second handle member such that the inner pull rod will undergo sliding movement from the home position to the retracted positions relative to the outer support tube as the second handle member is moved from the unactuated position to the actuated position relative to the first handle member.

17 Claims, 7 Drawing Sheets

HAND-ACTUATED SPRING CLIP INSERTION TOOL

BACKGROUND OF THE INVENTION

1. Field of the Invention

The present invention relates generally to tools used in fabrication of nuclear reactor core component rods and/or fuel rods and, more particularly, is concerned with a hand-actuated tool operable for inserting and releasing a spring clip at a desired axial position in a tube of a core component or fuel rod.

2. Description of the Prior Art

A nuclear reactor core is composed of a large number of nuclear fuel assemblies arranged in side-by-side relationship. Each fuel assembly includes a plurality of fuel rods held in a stationary array by a skeleton of the fuel assembly. The fuel assembly skeleton is composed of a plurality of control rod guide thimbles disposed between and extending parallel to the fuel rods, a plurality of grids mounted to and axially spaced along the guide thimbles and supporting the array of fuel rods, and top and bottom nozzles dispose adjacent to and attached at opposite ends of the guide thimbles. Each fuel rod includes an outer hollow tube sealed by end plugs attached to opposite ends of the tube and a plurality of fuel pellets disposed in stacked relation within the tube.

In addition to fuel rods, typically some of the nuclear fuel assemblies also include core component rods, such as control rods, secondary source rods, and burnable poison rods. Control rods are reciprocally movable within the guide thimbles of the fuel assemblies to control the fission process over the life of the fuel assembly. Secondary source rods and burnable poison rods are mounted in removable subassemblies which can be inserted into selected fuel assemblies. Secondary source rods have internal components, such as highly enriched material, which provide additional reactivity to facilitate start-up. Burnable poison rods have internal components, such as neutron absorbing material, which function to enhance distribution of fuel during burnup.

Core component rods have outer tubes which contain the internal components and are sealed by end plugs connected to opposite ends of the tubes. The internal components thermally expand during operation of the reactor core and thus empty space must be initially provided in the outer tubes between the internal components and end plugs.

It is desirable to provide some type of mechanical restraint or retention device, such as a C-shaped spring clip, within the tubes to retain the internal components in "as-loaded" locations and prevent their movement during shipping and handling. The uncompressed spring clip has a diameter larger than the inside diameter of the tube of the core component rod so that after the spring clip is installed it bears against the inner wall of the tube, thereby resisting axial sliding loads of the internal components. Proper installation of the C-shaped spring clip involves, first, partially compressing the clip to a diameter less than that of the tube; then, inserting the compressed clip into the tube to the desired location; and, finally, releasing the clip at the desired location in the tube. The desired axial location of the spring clip inside the tube varies greatly from one core component rod design to another.

Prior art tools to facilitate the insertion and release of a spring clip in a core component rod tube are described in U.S. Pat. No. 4,514,889 to Ferlan et al which is assigned to the assignee of the present invention. While these tools represented steps in the right direction, they have certain disadvantages in design and use in terms of their bulkiness and excessive weight, difficulty of insertion and manipulation, inability to actuate with one hand in a "natural" position while maintaining the tools in proper alignment with the rod tube, lack of means to tell if the clip is in proper axial position prior to actuation to release the clip, and inherent potential for damaging the rod tube.

Consequently, there is a need for a spring clip insertion tool having an improved design that will overcome the above-described disadvantages.

SUMMARY OF THE INVENTION

The present invention provides a hand-actuated insertion tool designed to satisfy the aforementioned needs. The hand-actuated insertion tool of the present invention is operable for inserting and releasing a spring clip at a desired axial position in a tube of a core component rod to hold internal components of the rod in place so as to avoid dislocation and damage during shipping and handling of the rod. The handactuated insertion tool is light in weight, can be easily and naturally manipulated by one hand (while using the other hand to keep the rod tube in position), and has graduated marks and a movable collar on its shaft so as to confirm and/or set proper clip insertion depth.

Accordingly, the present invention is directed to a hand-actuated insertion tool which comprises: (a) a handle assembly including a first handle member and a second handle member pivotally mounted to the first handle member for movement between unactuated and actuated positions; (b) means attached in a fixed relation to the first handle member and extending therefrom for defining a linear guide channel; (c) means extending along the linear guide channel for positioning an object adjacent to an end of the linear guide channel, the positioning means being slidably movable relative to the linear guide channel between home and retracted positions; and (d) means for movably coupling the positioning means to the second handle member such that the positioning means will undergo sliding movement from the home position to the retracted position as the second handle member is moved from the unactuated position to the actuated position relative to the first handle member; (e) the stationary guide channel defining means being disposed relative to the positioning means for causing release of the object from the positioning means adjacent to the end of the linear guide channel upon movement of the positioning means from the home position to the retracted position.

The handle assembly of the tool also includes means mounted between the first and second handle members for biasing the second handle member toward the unactuated position relative to the first handle member. Preferably, the biasing means is an extension spring. Also, the tool further includes means for releasably locking the second handle member in a fixed relation to the first handle member when the second handle member is disposed at the unactuated position relative to the first handle member.

The linear guide channel defining means of the tool is an elongated hollow outer support tube. The outer support tube has a plurality of graduated marks imprinted thereon for gaging the distance to the end of the shaft. Also, a collar is mounted about the support tube for adjustable movement therealong to provide a stop disposed at a preselected position along the graduated marks. The positioning means is an elongated inner pull rod mounted within the outer support tube for sliding movement relative thereto between the home and retracted positions.

Further, the coupling means includes an arm rigidly connected to the second handle member and having an elongated slot defined therein, and a pin fixed to the inner pull rod and extending through the slot such that pivoting of the arm with pivotal movement of the second handle member imposes a camming action on the pin by the arm causing linear movement of the inner pull rod relative to the outer support tube. The slot extends at an acute angle relative to a line extending between said pin and a pivotal axis of the arm.

The tool also includes means in the form of a latch finger for releasably locking the arm in a fixed relation to the first handle member when the second handle member is disposed at the unactuated position relative to the first handle member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

IN GENERAL

Figure 1:
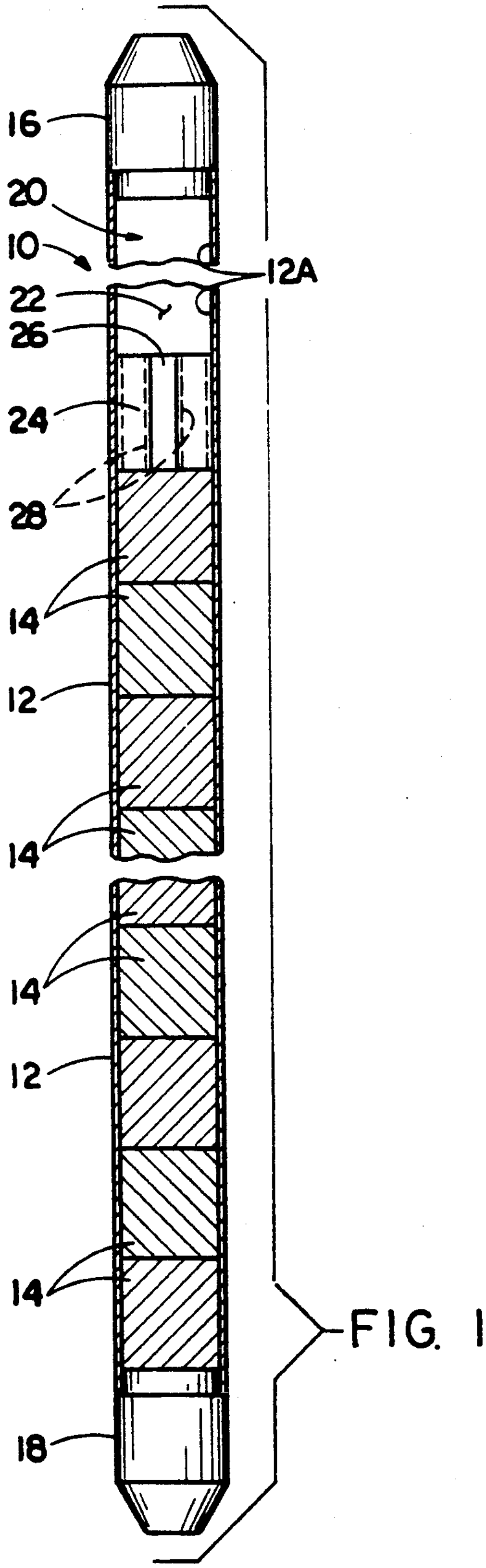
FIG. 1 is a longitudinal axial sectional view of a core component rod of the type utilized in a fuel assembly of a nuclear reactor, with a C-shaped spring clip installed therein.

Referring now to the drawings, and particularly to FIG. 1, there is shown a core component rod 10, such as a burnable poison rod, of the type utilized in a fuel assembly of a nuclear reactor. The core component rod 10 is composed of an elongated hollow tube 12 containing a plurality of internal components 14, such as a stack of pellets of burnable absorber material, and a pair of opposite end plugs 16, 18 attached to and sealing the opposite ends of the rod tube 12. A sealed interior chamber 20 is defined in the rod tube 12 between the opposite end plugs 16, 18 which is greater in length than the stack of pellets 14 contained therein so as to provide extra empty space 22 within the core component rod 10 for accumulation of thermal expansion of the pellets 14 and gases released during operation of the nuclear reactor.

Figure 3:
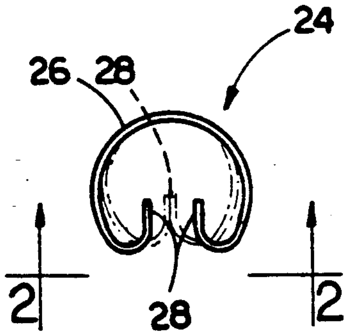
FIG. 3 is a top plan view of the spring clip as seen along line 3—3 of FIG. 2.
Figure 2:
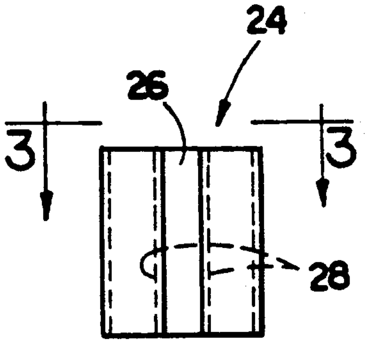
FIG. 2 is an enlarged side elevational view of the spring clip alone as seen along line 2—2 of FIG. 3.

Referring to FIGS. 2 and 3, a retention device 24, such as a C-shaped spring clip, is installed in the tube 12 of the core component rod 10 to hold the pellets 14 in the end-to-end contact with one another in the stacked arrangement so as to prevent their dislocation and movement during shipping and handling which could result in damage to them or to the rod 10 itself. As depicted in FIG. 3, the spring clip 24 is resiliently flexible so that it can be squeezed from an uncompressed configuration shown in solid line form to a compressed configuration shown in broken line form. When the squeezing force on the spring clip 24 is released, the spring clip 24 automatically returns to its uncompressed configuration.

The compressible spring clip 24 includes a generally semi-cylindrical C-shaped body 26 and a pair of spaced inturned tangs 28. The spring clip 24 has a diameter larger than the inside diameter of the rod tube 12 of the core component rod 10 so that after the spring clip 24 is installed in the rod tube 12 the spring clip 24 bears outwardly against the inner wall surface 12A of the rod tube 12 with sufficient frictional force to resist axial sliding loads imposed by the pellets 14 on the spring clip 24. Proper installation of the C-shaped spring clip 24 involves, first, compressing the spring clip 24 to a diameter less than that of the inside diameter of the rod tube 12; then, inserting the compressed spring clip 24 into the rod tube 12 to the desired location; and, finally, releasing the spring clip 24 at the desired location in the rod tube 12, such as shown in FIG. 1.

Hand-Actuated Insertion Tool of Present Invention

Referring to FIGS. 4–8, there is illustrated a hand-actuated insertion tool of the present invention, generally designated 30, for use in inserting and releasing the spring clip 24 at the desired location in the tube 12 of the core component rod 10 or any other similar rods, such as a fuel rod (not shown). The insertion tool 30 basically includes a handle assembly 32, an elongated hollow outer support tube 34, an elongated inner pull rod 36, and a coupling arrangement 38.

In accordance with the present invention, the handle assembly 32 of the tool 30 includes a first or top handle member 40, a second or bottom handle member 42, and a resiliently flexible member in the form of an extension spring 44. The second handle member 42 is pivotally mounted to first handle member 40 for pivotal movement about an axis A between unactuated and actuated positions respectively shown in FIGS. 4 and 5. and respectively shown in solid and dashed line forms in FIG. 6. The extension spring 44 extends between and is mounted to the first and second handle members 40, 42 for biasing the second handle member 42 toward the unactuated position relative to the first handle member 40.

The first handle member 40 of the handle assembly 32 has a generally L-shaped configuration and includes a long leg portion 46 and a short leg portion 48. The long leg portion 46 is composed of an elongated grip bar 46 of generally rectangular cross-sectional configuration and has an elongated cavity 50 recessed along one side of the grip bar 46. The extension spring 44 is disposed in the cavity 50, being anchored at one end to the bar 46 by a pin 52 fixed to the grip bar 46 and extending across one end of the cavity 50.

The short leg portion 48 of the first handle member 40 is composed of a clamp block 54 spaced from an inner end 46A of the grip bar 46 and a pair of spaced plates 56 attached at respective opposite ends portions thereof to the opposite sides of the clamp block 54 and of the grip bar 46. The end portions of the plates 56 attached to the grip bar 46 have triangular sections 56A between and to which is pivotally mounted the second handle member 42 by a pivot pin 58.

The second handle member 42 of the handle assembly 32 includes a pull arm 60 having a transverse bore 62 receiving the pivot pin 58 and an elongated cylindrical grip bar 64 affixed at an inner end 64A to the arm 58 by a fastener 63. The outer end 64B of grip bar 64 of the second handle member 42 abuts a stop 66 mounted on the outer end 46B of the grip bar 46 of the first handle member 40 when the second handle member 42 has been pivoted to the actuated position of FIG. 5. A tang 68 is rigidly affixed to the pull arm 60 and projects into the cavity 50. The opposite end of the extension spring 44 is hooked over an outer tab 68A on the tang 68 and through it imposes a biasing force on the pull arm 60 which causes the second handle member 42 to normally assume its unactuated position of FIG. 4 (also shown in solid line form in FIG. 6).

Referring to FIGS. 4–16, the elongated outer support tube 34 of the insertion tool 30 has one end 34A inserted through and clamped within a split bore 70 in the clamp block 54 of the first handle member 40. The opposite other end 34B of the outer support tube 34, which is disposed remotely from the handle assembly 32, includes a short adapter sleeve 72 having an outside diameter slightly less than the inside diameter of the tube 12 of the core component rod 12 to permit the sleeve 72 to fit within an end of the tube 12 of the core component rod 12.

Figure 4:
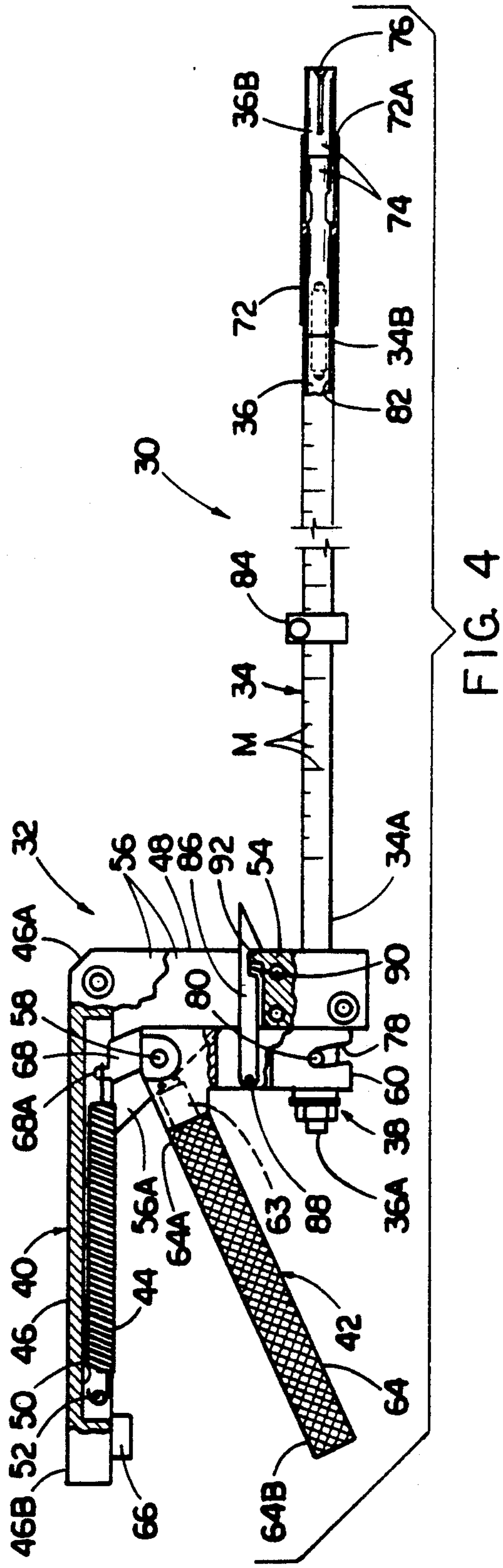
FIG. 4 is a foreshortened side elevational view, partly in section, of a hand-actuated insertion tool of the present invention, showing the home position of the tool.
Figure 5:
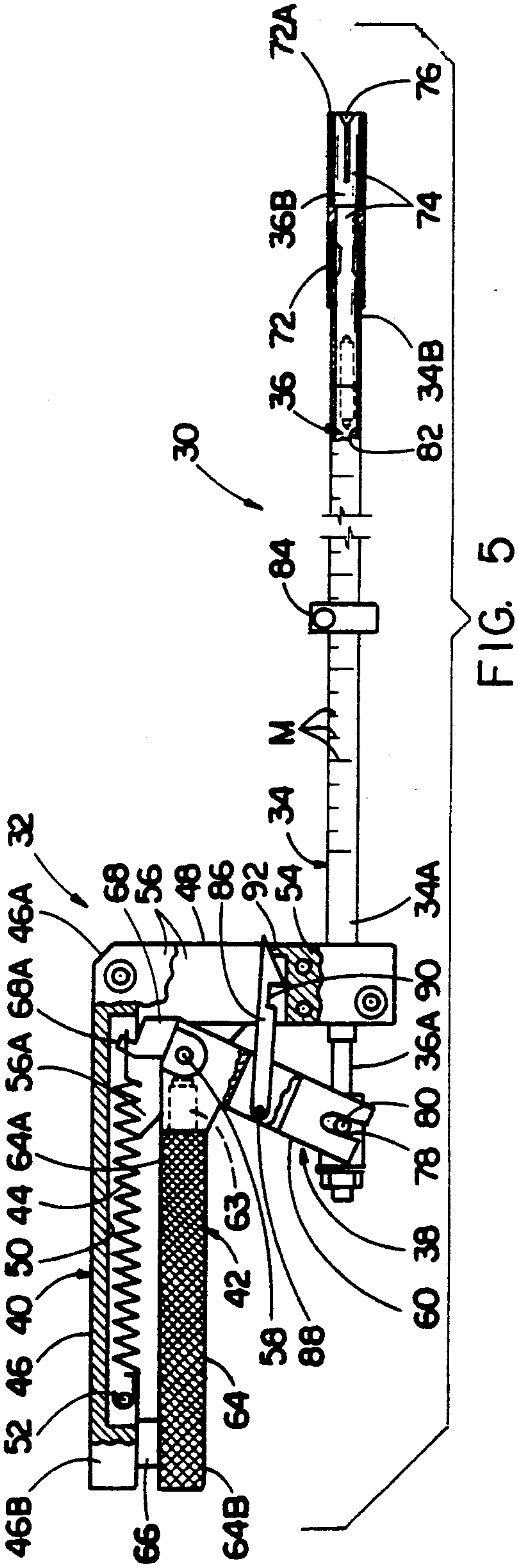
FIG. 5 is a foreshortened side elevational view, partly in section, of the hand-actuated insertion tool, showing the retracted position of the tool.

The elongated inner pull rod 36 of the insertion tool 30 is mounted loosely within the outer support tube 34 for sliding movement relative thereto between home and retracted positions depicted respectively in FIGS. 4 and 5 which correspond to the unactuated and actuated positions of the handle assembly 32. The inner pull rod 36 has a pair of opposite ends 36A, 36B which extend respectively from the opposite ends 34A, 34B of the outer support tube 34 when the pull rod 36 is at the home position of FIG. 4. Thus, the one end 36A of the inner pull rod 36 is capable of being coupled to the pull arm 60 of the second handle member 42 while the other end 36B of the inner pull rod 36 is capable of releasably receiving the spring clip 24 when the pull rod 36 is at the home position.

Figure 18:
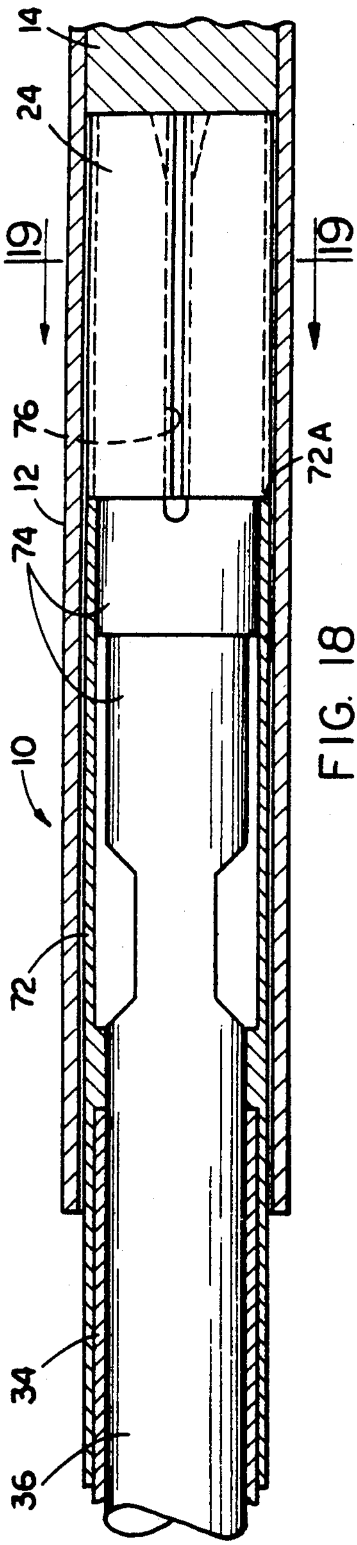
FIG. 18 is an enlarged fragmentary side elevational view, partly in section, of the mandrel-end of the insertion tool with a spring clip supported thereon and inserted within a tube of a core component rod.
Figure 19:
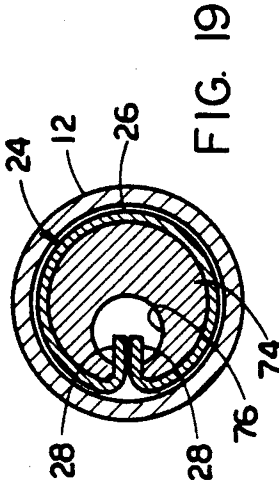
FIG. 19 is a cross-sectional view of the insertion tool mandrel and spring clip supported thereon taken along line 19—19 of FIG. 18.

Furthermore, referring to FIGS. 4, 5 and 9–23, the other end 36B of the inner pull rod 36 includes a short mandrel 74 having an outside diameter less than the inside diameter of the adapter sleeve 72 and a longitudinal slot 76 adapting the mandrel 74 to receive the spring clip 24 when in a compressed condition, as depicted in FIGS. 18 and 19 and permit insertion of the mandrel 74 with the spring clip 24 thereon into the rod tube 12. The terminal end 72A of the adapter sleeve 72 of the outer support tube 34 is thus disposed relative to spring clip 24 on the mandrel 74 of the inner pull rod 36 such that the mandrel 74 will withdraw into the sleeve 74 so as to cause engagement of the spring clip 24 with the terminal end 72A of the sleeve 72 and thereby release of the spring clip 24 from the mandrel 74 of the inner pull rod 36 to the desired location within the rod tube 12 adjacent to remote end 34B of the outer support tube 34 upon movement of the inner pull rod 36 from the home position of FIGS. 4, 18 and 22 to the retracted position of FIGS. 5, 20 and 23.

Figure 6:
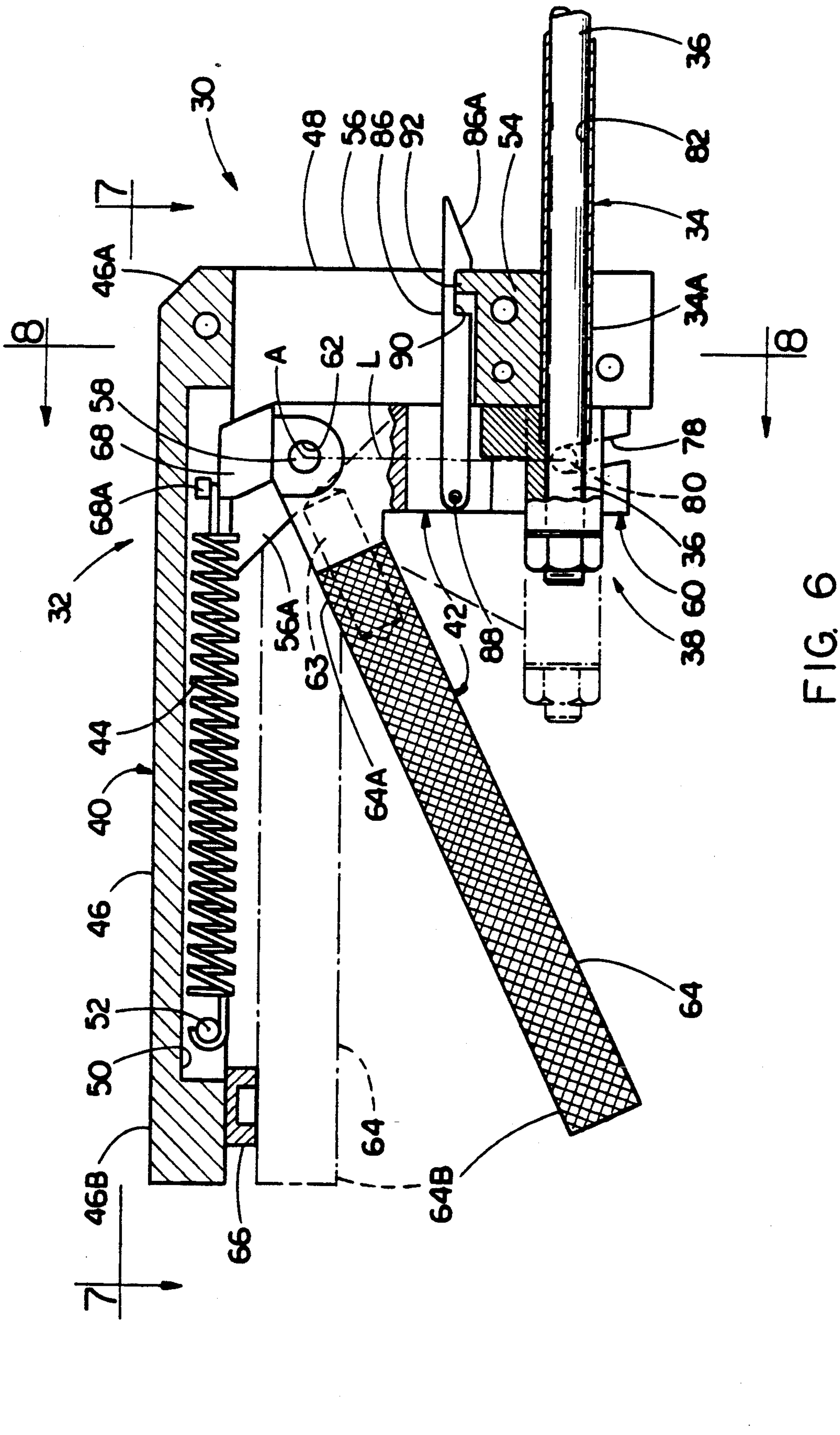
FIG. 6 is a fragmentary enlarged side elevational view of the hand-actuated insertion tool, illustrating a spring-loaded handle assembly of the tool.
Figure 7:
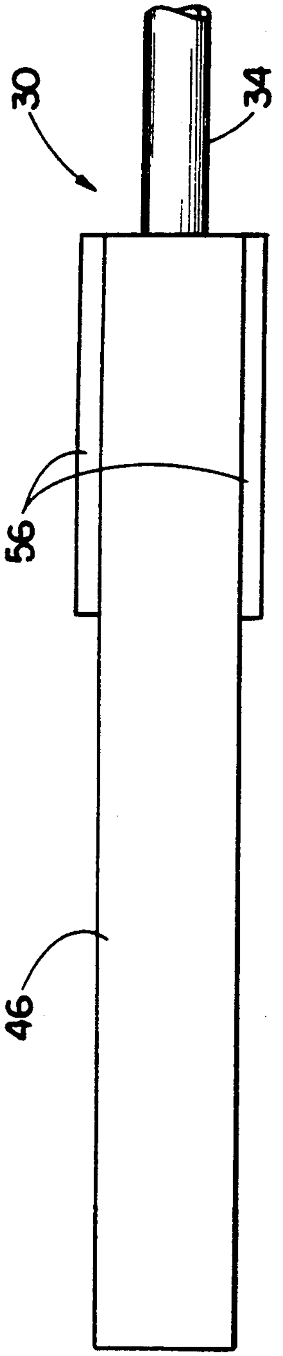
FIG. 7 is a top plan view of the handle assembly as seen along line 7—7 of FIG. 6.
Figure 8:
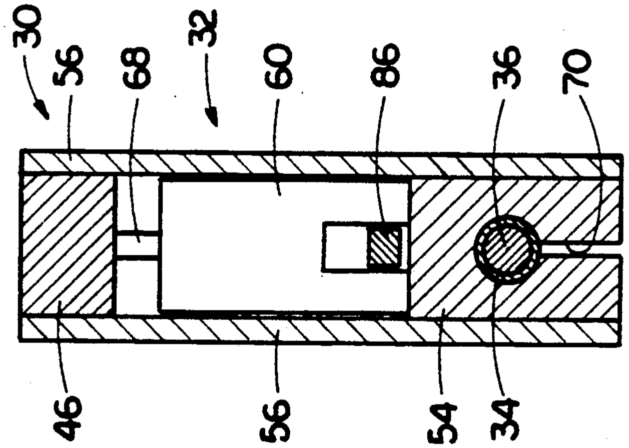
FIG. 8 is a cross-sectional view of the handle assembly taken along line 8—8 of FIG. 6.
Figures 9, 10, 11, 12, 13, 14, 15, 16, 17:
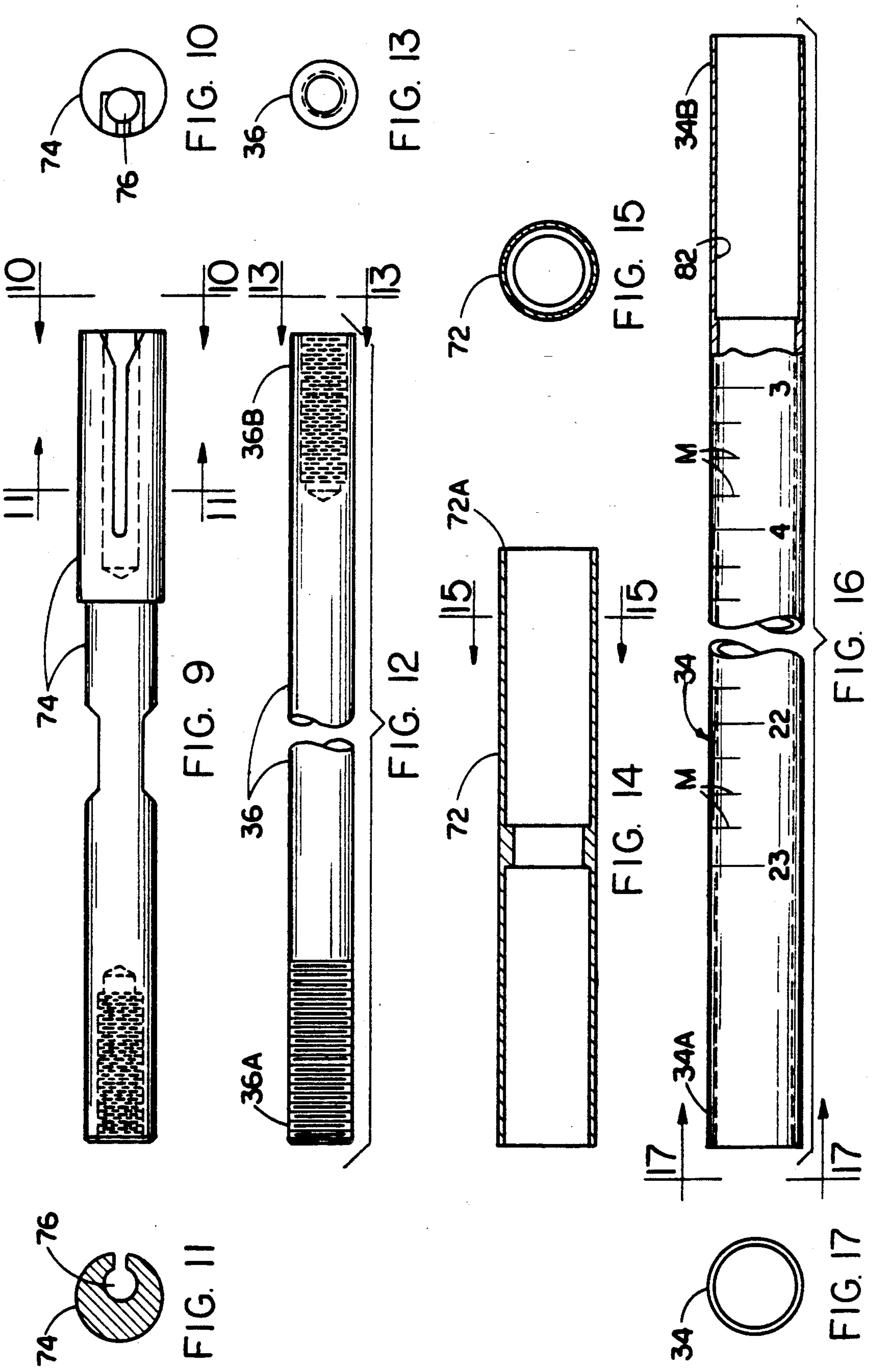
FIG. 9 is an enlarged side elevational view of a mandrel of the hand-actuated insertion tool of FIG. 4.
FIG. 10 is an end elevational view of the insertion tool mandrel as seen along line 10—10 of FIG. 9.
FIG. 11 is a cross-sectional view of the insertion tool mandrel taken along line 11—11 of FIG. 9.
FIG. 12 is an enlarged side elevational view of an elongated pull rod of the hand-actuated insertion tool of FIG. 4.
FIG. 13 is an end elevational view of the insertion tool pull rod as seen along line 13—13 of FIG. 12.
FIG. 14 is an enlarged longitudinal axial sectional view of an end sleeve of the hand-actuated insertion tool of FIG. 4.
FIG. 15 is a cross-sectional view of the insertion tool end sleeve taken along line 15—15 of FIG. 14.
FIG. 16 is an enlarged side elevational view, shown partly in longitudinal axial section, of an outer support tube of the hand-actuated insertion tool of FIG. 4.
FIG. 17 is an end elevational view of the insertion tool outer support tube as seen along line 17—17 of FIG. 16.
Figure 20:
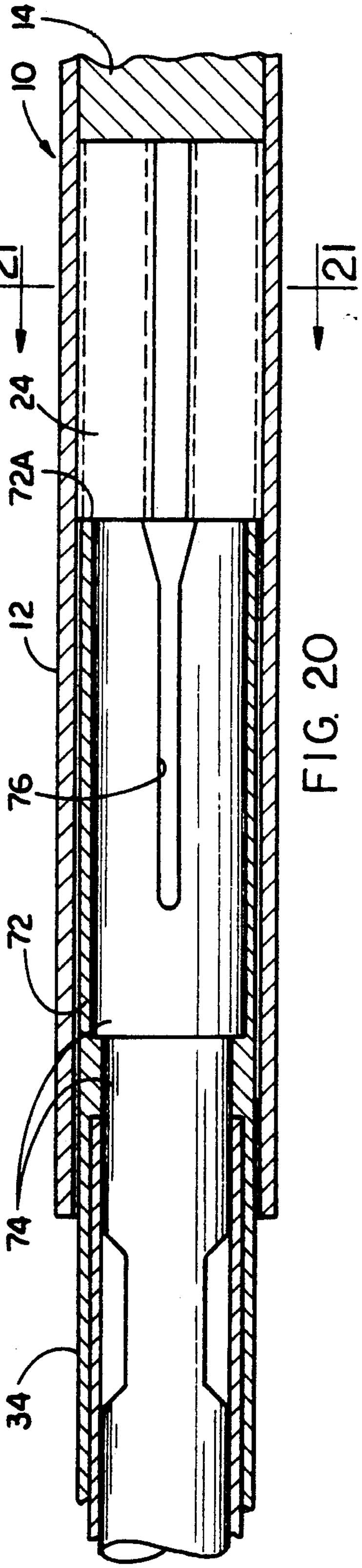
FIG. 20 is a view similar to that of FIG. 18, but showing the mandrel-end of the insertion tool after removal of the spring clip therefrom into engagement with the inner wall of the tube of the core component rod.
Figure 21:
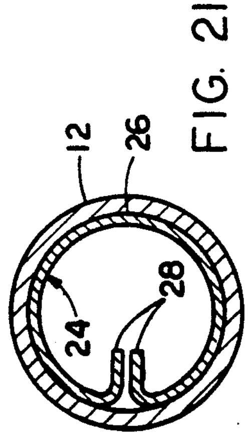
FIG. 21 is a cross-sectional view of the tube and spring clip therein taken along line 21—21 of FIG. 20.
Figure 22:
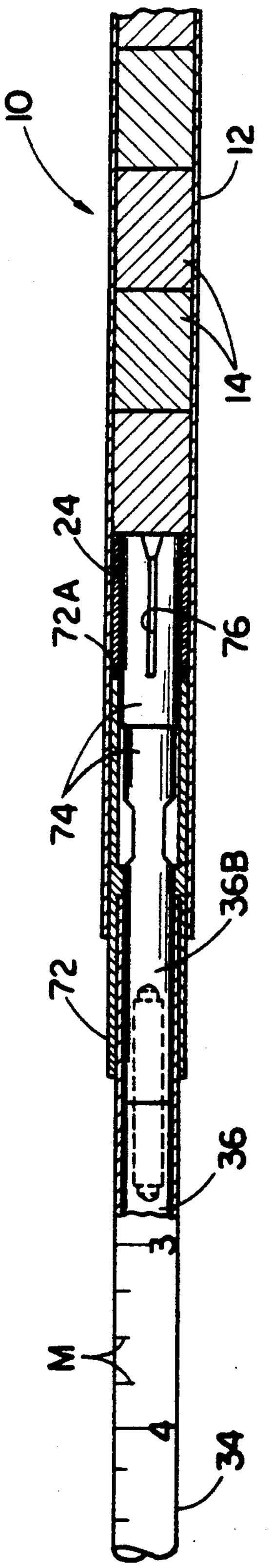
FIG. 22 is a view of the mandrel-end of the insertion tool and core component rod similar to that of FIG. 18, but on a somewhat smaller scale.
Figure 23:
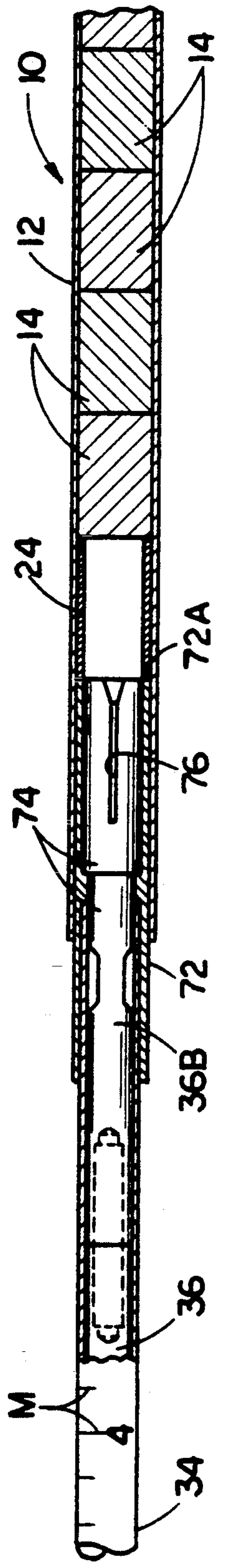
FIG. 23 is a view of the mandrel of the insertion tool and core component rod similar to that of FIG. 20, but on a somewhat smaller scale.

The coupling arrangement 38 of the insertion tool 30 couples the inner pull rod 36 at its one end 36A to the pull arm 60 of the second handle member 42 such that the pull rod 36 can undergo sliding movement from the home position of FIGS. 4, 18 and 22 to the retracted position of FIGS. 5, 20 and 23 relative to the outer support tube 34 as the second handle member 42 is moved from the unactuated position to the actuated position relative to said first handle member 40. Referring to FIGS. 4-6, the coupling arrangement 38 includes the pull arm 60 attached in fixed relation to grip bar 64 of the second handle member 42, an elongated slot 78 defined into the pull arm 60, and a pin 80 fixed to the one end 36A of the inner pull rod 36. The slot 78 extends in inclined fashion at an acute angle relative to a line L extending between the pin 80 and the pivotal axis A of the pull arm 64 (which is the same as the pivotal axis of the second handle member 42). The pin 80 extends across and through the slot 78 such that pivoting of the pull arm 64 with pivotal movement of the second handle member 42 imposes a camming action on the pin 80 by the pull arm 60 causing linear movement of the pull rod 60 relative to a linear guide channel 82 defined by the outer support tube 34.

Also, referring to FIGS. 4, 5, 16, 22 and 23, in accordance with the present invention, the insertion tool 30 also includes a scale of graduated marks M imprinted, scribed or etched, on the exterior surface of the outer support tube 34 for facilitating the gaging of the distance to the other end 34B of the support tube 34 and thus to the location of the spring clip 24. Also, referring to FIGS. 4 and 5, a collar 84 is mounted about the outer support tube 34 for adjustable movement therealong to provide a stop disposed at a preselected position along the graduated marks.

Finally, referring again to FIGS. 4–6, the insertion tool 30 includes means in the form of a latch pawl or finger 86 for releasably locking the pull arm 60 and thereby the second handle member 42 in a fixed relation to the first handle member 40 and thus the inner pull rod 36 in a fixed relation to the outer support tube 34 when the second handle member 42 is disposed at the unactuated position relative to the first handle member 40. The latch finger 86 is pivotally mounted at pin 88 to the pull arm 60 for movement between latched and unlatched positions respectively shown in FIGS. 4 and 5. In the latched position, a notch 90 in the end of the latch finger 86 fits over and interengages with a tab 92 defined on the clamp block 54 of the first handle member 40. The latch finger 86 can easily be pivoted manually to its unlatched position by using a finger to raise the latch finger 86 at its forward tip 86A at the same time it is desired to squeeze on the hand grip bar 64 of the second handle member 42 to move it toward the hand grip bar 46 of the first handle member 40.

As compared to prior art insertion tools, the insertion tool 30 of the present invention has the following advantages: (1) the ability to accommodate any insertion length or depth required by easily exchanging inner pull rods 36 and outer support tubes 34 of varying lengths; (2) the means of verifying insertion and clip disengagement depth via a visible graduated scale on the outer support tube surface; (3) the means of positively setting an absolute clip insertion depth, if required, via a movable, lockable collar 84 adjustable mounted about the outer support tube 34; (4) the cam-action actuation slot 78 in the pull arm 60 of the second handle member 42 which provides mechanical advantage during tool actuation and facilitates easy operator use; (5) the swinging latch finger 86 which locks the pull rod 36 and its clip pre-compression mandrel 74 in fixed position during clip preattachment to the tool 30 and during tool insertion into the tube 12 of the core component rod 10; (6) the handle assembly spring 44 which serves to automatically return the second handle member 42 to the unactuated position from the actuated position and thereby return the inner pull rod 36 to a "ready" position for clip reloading; (7) the particular arrangement and configuration of the handle assembly 32 which provides ease of use and maintenance and permits the handle assembly 32 to be actuated with the operator's hand in a natural position while preserving relative light tool weight, providing low bulkiness, presenting a small overall size and profile, and giving complete disassembly and reassembly capability.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A hand-actuated insertion tool, comprising:

(a) a handle assembly including a first handle member, a second handle member pivotally mounted to the first handle member for movement between unactuated and actuated positions and biasing means mounted between said first and second handle members for biasing said second handle member toward said unactuated position relative to said first handle member;

(b) means for releasably locking said second handle member in a fixed relation to said first handle member when said second handle member is disposed at said unactuated position relative to said first handle member;

(c) means attached in a fixed relation to said first handle member and extending therefrom for defining a linear guide channel;

(d) means extending along said linear guide channel for positioning an object adjacent to an end of said linear guide channel, said positioning means being slidably movable relative to said linear guide channel between home and retracted positions; and (e) means for movably coupling said positioning means to said second handle member such that said positioning means will undergo sliding movement from the home position to the retracted position as said second handle member is moved from the unactuated position to the actuated position relative to said first handle member;

(f) said guide channel defining means being disposed relative to said positioning means for causing release of the object from said positioning means adjacent to said end of said linear guide channel upon movement of said positioning means from said home position to said retracted position.

2. The tool as recited in claim 1, wherein said biasing means is an extension spring.

3. The tool as recited in claim 1, wherein said coupling means includes:

an arm attached in a fixed relation to said second handle member and having an elongated slot defined therein; and a pin fixed to said positioning means and extending through said slot such that pivoting of said arm with pivotal movement of said second handle member imposes a camming action on said pin by said arm causing linear movement of said positioning means relative to said guide channel defining means.

4. The tool as recited in claim 1, wherein said linear guide channel defining means includes an elongated hollow outer support tube.

5. The tool as recited in claim 4, further comprising:

a scale of graduated marks imprinted on said outer support tube for gaging the distance to said end of said tube.

6. The tool as recited in claim 5, further comprising:

a collar mounted to said support tube for adjustable movement therealong to provide a stop disposed at a preselected position along said graduated marks.

7. The tool as recited in claim 4, wherein said outer support tube has a pair of opposite ends, said tube being attached in a fixed relation to one of said ends to said first handle member and open at the other of said ends.

8. The tool as recited in claim 4, wherein said positioning means includes an elongated inner pull rod mounted within the outer support tube for sliding movement relative thereto between said home and retracted positions.

9. The tool as recited in claim 8, wherein said coupling means includes:

an arm fixed to said second handle member and having an elongated slot defined therein; and a pin fixed to said inner pull rod and extending through said slot such that pivoting of said arm with pivotal movement of said second handle member imposes a camming action on said pin by said arm causing linear movement of said inner pull rod relative to said outer support tube.

10. The tool as recited in claim 9, wherein said slot extends at an acute angle relative to a line extending between said pin and a pivotal axis of said arm.

11. The tool as recited in claim 10, further comprising:

means for releasably locking said arm in a fixed relation to said first handle member when said second handle member is disposed at said unactuated position relative to said first handle member.

12. A hand-actuated insertion tool, comprising:

(a) a handle assembly including a first handle member, a second handle member pivotally mounted to said first handle member for movement between unactuated and actuated positions, and a resiliently flexible member mounted between said first and second handle members for biasing said second handle member toward said unactuated position relative to said first handle member;

(b) an elongated hollow outer support tube having a pair of opposite ends, one of said ends of said outer support tube being attached to said first handle member of said handle assembly and the other of said ends of said outer support tube being disposed remote from said first handle member;

(c) an elongated inner pull rod mounted within said outer support tube for sliding movement relative thereto between home and retracted positions, said pull rod having a pair of opposite ends which extend respectively from said opposite ends of said outer support tube when said pull rod is at said home position such that one of said opposite ends of said pull rod is capable of being coupled to said second handle member while the other of said opposite ends of said pull rod is capable of releasably receiving an object for installation at a desired location; and (d) coupling means for coupling said inner pull rod at said one end thereof to said second handle member such that said pull rod will undergo sliding movement from said home position to said retracted position relative to said outer support tube as said second handle member is moved from said unactuated position to said actuated position relative to said first handle member, said coupling means including:

an arm attached in a fixed relation to said second handle member and having an elongated slot defined therein; and a pin fixed to said pull rod and extending through said slot such that pivoting of said arm with pivotal movement of said second handle member imposes a camming action on said pin by said arm causing linear movement of said pull rod relative to said outer support tube;

(e) said outer support tube being disposed relative to said pull rod such that said other end of said pull rod carrying the object will withdraw into said other end of said outer support tube so as to cause engagement of the object with said other end of said outer support tube and thereby release of the object from said other end of said pull rod to the desired location adjacent to said other end of said outer support tube upon movement of said pull rod from said home position to said retracted position.

13. The tool as recited in claim 12, wherein said slot extends at an actuate angle relative to a line extending between said pin and a pivotal axis of said arm.

14. The tool as recited in claim 12, further comprising:

a scale of graduated marks imprinted on said outer support tube for gaging the distance to said end of said tube.

15. The tool as recited in claim 12, further comprising:

a collar mounted about said support tube for adjustable movement therealong to provide a stop disposed at a preselected position along said graduated marks.

16. The tool as recited in claim 13, further comprising:

means for releasably locking said arm in a fixed relation to said first handle member when said second handle member is disposed at said unactuated position relative to said first handle member.

17. The tool as recited in claim 16, wherein said locking means includes:

a latch finger pivotally mounted to said arm for movement between latched and unlatched positions; and a tab on said first handle member being interengageable with said latch finger when said latch finger is at said latched position.

* * * * *